(12) United States Patent
Wänstedt et al.

(10) Patent No.: US 12,075,112 B2
(45) Date of Patent: Aug. 27, 2024

(54) ENABLING RENDERING OF USER-SPECIFIC INFORMATION USING A DISPLAY DEVICE

(71) Applicant: Telefonaktiebolaget LM Ericsson (publ), Stockholm (SE)

(72) Inventors: Stefan Wänstedt, Luleå (SE); Peter Ökvist, Luleå (SE); Tommy Arngren, Södra Sunderbyn (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 18/011,886

(22) PCT Filed: Jun. 26, 2020

(86) PCT No.: PCT/EP2020/068146
§ 371 (c)(1),
(2) Date: Dec. 21, 2022

(87) PCT Pub. No.: WO2021/259508
PCT Pub. Date: Dec. 30, 2021

(65) Prior Publication Data
US 2023/0171460 A1    Jun. 1, 2023

(51) Int. Cl.
*H04N 21/431* (2011.01)
*H04N 21/235* (2011.01)

(52) U.S. Cl.
CPC ....... *H04N 21/4316* (2013.01); *H04N 21/235* (2013.01)

(58) Field of Classification Search
CPC .................. H04N 21/4316; H04N 21/235
See application file for complete search history.

(56) References Cited

U.S. PATENT DOCUMENTS

| | | | |
|---|---|---|---|
| 2012/0278616 A1* | 11/2012 | Stevens | H04L 9/0861 713/165 |
| 2017/0351470 A1* | 12/2017 | Beaven | G06F 3/1423 |
| 2018/0098215 A1* | 4/2018 | Roberts | H04N 7/183 |
| 2019/0212966 A1 | 7/2019 | Lee et al. | |

OTHER PUBLICATIONS

"Parallel reality", MisappliedSciences, <https://www.misappliedsciences.com/Home/Technology.html>, 2020, 1-7.

(Continued)

*Primary Examiner* — Mulugeta Mengesha
(74) *Attorney, Agent, or Firm* — Murphy, Bilak & Homiller, PLLC

(57) ABSTRACT

It is provided a method for enabling rendering of user-specific information using a display device, the method being performed by a user device comprising a camera, the user device being separate from the display device. The method comprises the steps of: determining a selected display device and creating a logical association between the user device and the selected display device; capturing at least one image of the display device using the camera; decoding the at least one image, resulting in decoded content; and rendering the decoded content for a user of the user device in a location corresponding to the selected display device.

20 Claims, 6 Drawing Sheets

(56) References Cited

OTHER PUBLICATIONS

Brown, Bruce, et al., "Mercedes-Benz Digital Light LED headlights display messages on the road", Digital Trends Media Group, Aug. 22, 2018, 1-14.

Sasaki, Taito, et al., "Data signal modulation scheme based on perceptually uniform color space for image sensor-based visible light communication", 2019 IEEE VTS Asia Pacific Wireless Communications Symposium (APWCS), Aug. 28, 2019, 1-5.

Shaaban, Rana, et al., "A survey of Indoor Visible light communication power distribution and Color shift keying", 2017 IEEE International Conference on Electro Information Technology (EIT), May 14, 2017, 149-153.

* cited by examiner

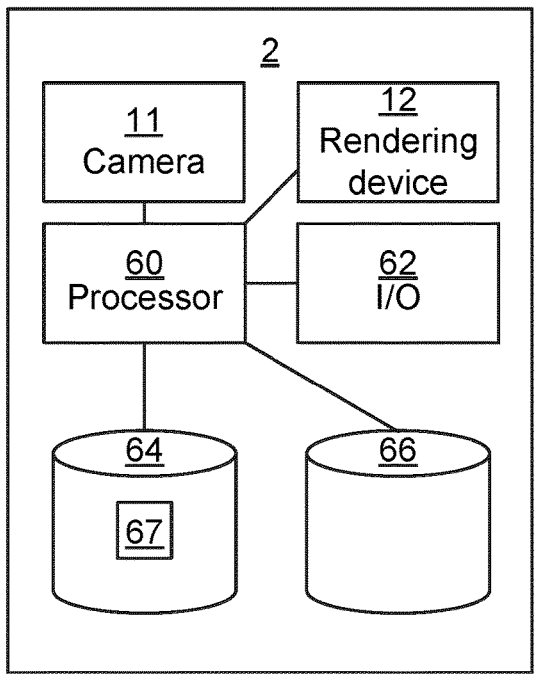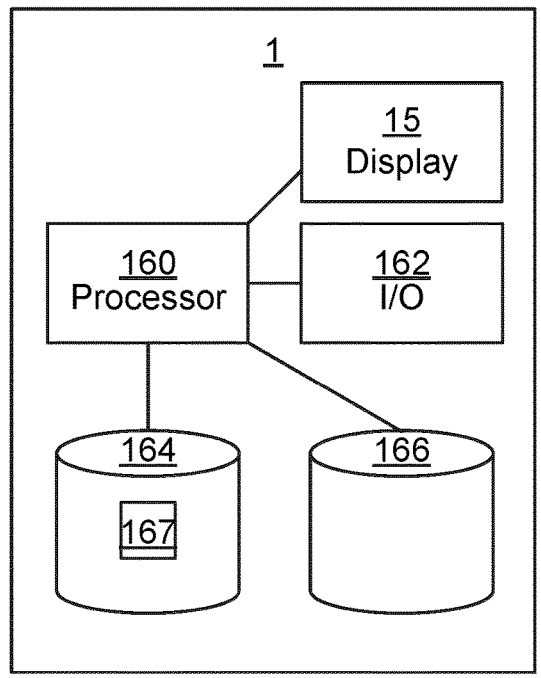
Fig. 5
Fig. 6
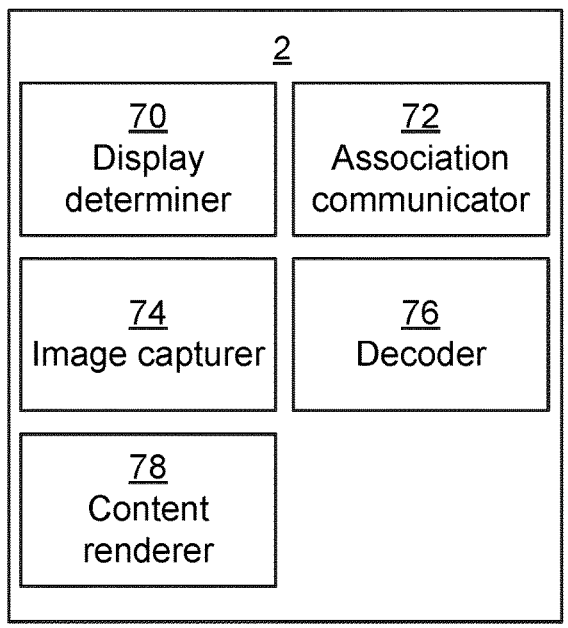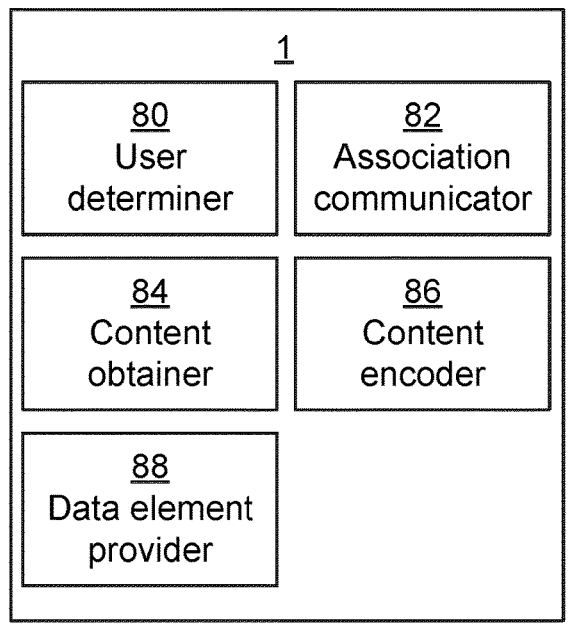
Fig. 7
Fig. 8

ENABLING RENDERING OF USER-SPECIFIC INFORMATION USING A DISPLAY DEVICE

TECHNICAL FIELD

The present disclosure relates to the field of the provision of user-specific information and in particular to enabling rendering of user-specific information using a display device which is separate from a user device.

BACKGROUND

In many public locations there are display devices that present visual content e.g. in the form of television content, context relevant information, advertisements or other types of information. Examples of venues using such display devices are airports, public transport (e.g. metro) stations, shopping malls and sports bars. The content of the display device is visible to anyone within line of sight of the display device.

One way to improve such display devices is to provide user-specific information to a user looking at the screen. There are solutions available that provide such functionality; one such solution is provided by in a product called Parallel reality by MisappliedSciences, presented at https://www.misappliedsciences.com/Home/Technology at the time of filing this patent application.

With Parallel reality, the LEDs (Light Emitting Diodes) in the public screen can be controlled to direct light in different directions, e.g. to a specific user. However, if many users are located in more or less the same direction relative the display device, there is a risk that information intended for one user can be read by others (in similar positions).

SUMMARY

One object is to improve how public display devices can be used for providing user-specific information.

According to a first aspect, it is provided a method for enabling rendering of user-specific information using a display device, the method being performed by a user device comprising a camera, the user device being separate from the display device. The method comprises the steps of: determining a selected display device and creating a logical association between the user device and the selected display device; capturing at least one image of the display device using the camera; decoding the at least one image, resulting in decoded content; and rendering the decoded content for a user of the user device in a location corresponding to the selected display device.

The rendering may be performed using computer-generated visual content.

The step of rendering may comprise rendering the visual content such that the visual content at least partly covers the selected display device.

The step of decoding may comprise demodulating data elements in the at least one image, the data elements being visually provided by the display device.

The step of decoding may comprise applying a descrambling code to the data elements.

The data elements may be arranged in a two-dimensional space within the display device in the at least one image, in which case the descrambling code is in the form of a matrix corresponding to how the data elements are arranged in the two-dimensional space.

The descrambling code may be orthogonal to one or more other descrambling codes, respectively used for other user devices by the same display device.

The demodulating data elements may comprise demodulating the data elements from light intensity variations in the at least one image.

The method may further comprise the step of: triggering the logical association between the user device and the selected display device to be communicated to a server.

The step of triggering the logical association may comprise transmitting the logical association to the server.

The step of triggering the logical association may comprise triggering the selected display to transmit the logical association to the server.

According to a second aspect, it is provided a user device for enabling rendering of user-specific information using a display device, the user device being separate from the display device. The user device comprises: a camera; a processor; and a memory storing instructions that, when executed by the processor, cause the user device to: determine a selected display device and create a logical association between the user device and the selected display device; capture at least one image of the display device using the camera; decode the at least one image, resulting in decoded content; and render the decoded content for a user of the user device in a location corresponding to the selected display device.

The instructions to render may comprise instructions that, when executed by the processor, cause the user device to render using computer-generated visual content.

The instructions to render may comprise instructions that, when executed by the processor, cause the user device to render the visual content such that the visual content at least partly covers the selected display device.

The instructions to decode may comprise instructions that, when executed by the processor, cause the user device to demodulate data elements in the at least one image, the data elements being visually provided by the display device.

The instructions to decode may comprise instructions that, when executed by the processor, cause the user device to apply a descrambling code to the data elements.

The data elements may be arranged in a two-dimensional space within the display device in the at least one image, in which case the descrambling code is in the form of a matrix corresponding to how the data elements are arranged in the two-dimensional space.

The descrambling code may be orthogonal to one or more other descrambling codes, respectively used for other user devices by the same display device.

The instructions to demodulate data elements may comprise instructions that, when executed by the processor, cause the user device to demodulate the data elements from light intensity variations in the at least one image.

The user device may further comprise instructions that, when executed by the processor, cause the user device to trigger the logical association between the user device and the selected display device to be communicated to a server.

The instructions to trigger the logical association may comprise instructions that, when executed by the processor, cause the user device to transmit the logical association to the server.

The instructions to trigger the logical association may comprise instructions that, when executed by the processor, cause the user device to trigger the selected display device to transmit the logical association to the server.

According to a third aspect, it is provided a computer program for enabling rendering of user-specific information using a display device and a user device comprising a camera, the user device being separate from the display device. The computer program comprises computer program code which, when executed on the user device causes the user device to: determine a selected display device and create a logical association between the user device and the selected display device; capture at least one image of the display device using the camera; decode the at least one image, resulting in decoded content; and render the decoded content for a us of the user device in a location corresponding to the selected display device.

According to a fourth aspect, it is provided a computer program product comprising a computer program according to the third aspect and a computer readable means on which the computer program is stored.

According to a fifth aspect, it is provided a method for enabling rendering of user-specific information using a display device, the method being performed by the display device comprising a display. The method comprises the steps of: determining an associated user device and creating a logical association between the associated user device and the display device, the display device being separate from the associated user device; obtaining content to be provided to the associated user device; encoding the content, resulting in data elements; and providing the data elements using the display.

The step of encoding the content may comprise applying a scrambling code to the content, resulting in data elements.

The step of encoding may comprise modulating the data elements using intensity variations of picture elements in the display.

The encoding may comprise modulating data elements for a plurality of user devices.

Scrambling codes for different user devices may be orthogonal to each other.

The data elements may be arranged in a two-dimensional space of the display, in which case the scrambling code is in the form of a matrix corresponding to how the data elements are arranged in the two-dimensional space.

The method may further comprise the step of: triggering the logical association between the display device and the associated user device to be communicated to a server.

The step of triggering the logical association may comprise transmitting the logical association to the server.

The step of triggering the logical association may comprise triggering the associated user device to transmit the logical association to the server.

According to a sixth aspect, it is provided a display device for enabling rendering of user-specific information using the display device. The display device comprises: a display; a processor; and a memory storing instructions that, when executed by the processor, cause the display device to: determine an associated user device and creating a logical association between the associated user device and the display device, the display device being separate from the associated user device; obtain content to be provided to the associated user device; encode the content, resulting in data elements; and provide the data elements using the display.

The instructions to encode the content may comprise instructions that, when executed by the processor, cause the display device to apply a scrambling code to the content, resulting in data elements.

The instructions to encode may comprise instructions that, when executed by the processor, cause the display device to modulate the data elements using intensity variations of picture elements in the display.

The instructions to encode may comprise instructions that, when executed by the processor, cause the display device to modulate data elements for a plurality of user devices.

Scrambling codes for different user devices may be orthogonal to each other.

The data elements may be arranged in a two-dimensional space of the display, in which case the scrambling code is in the form of a matrix corresponding to how the data elements are arranged in the two-dimensional space.

The display device may further comprise instructions that, when executed by the processor, cause the display device to: trigger the logical association between the display and the associated user device to be communicated to a server.

The instructions to trigger the logical association may comprise instructions that, when executed by the processor, cause the display device to transmit the logical association to the server.

The instructions to trigger the logical association may comprise instructions that, when executed by the processor, cause the display device to trigger the associated user device to transmit the logical association to the server.

According to a seventh aspect, it is provided a computer program for enabling rendering of user-specific information using a display device comprising a display. The computer program comprises computer program code which, when executed on a display device causes the display device to: determine an associated user device and creating a logical association between the associated user device and the display device, the display device being separate from the associated user device; obtain content to be provided to the associated user device; encode the content, resulting in data elements; and provide the data elements using the display.

According to an eighth aspect, it is provided a computer program product comprising a computer program according to the seventh aspect and a computer readable means on which the computer program is stored.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

Aspects and embodiments are now described, by way of example, with reference to the accompanying drawings, in which:

FIG. 5 is a schematic diagram illustrating components of the user device of FIG. 1 and FIGS. 2A-B according to one embodiment;

FIG. 6 is a schematic diagram illustrating components of the display device of FIG. 1 and FIGS. 2A-B according to one embodiment;

FIG. 7 is a schematic diagram showing functional modules of the user device of FIG. 1 and FIGS. 2A-B according to one embodiment;

FIG. 8 is a schematic diagram showing functional modules of the display device of FIG. 1 and FIGS. 2A-B according to one embodiment.

DETAILED DESCRIPTION

The aspects of the present disclosure will now be described more fully hereinafter with reference to the accompanying drawings, in which certain embodiments of the invention are shown. These aspects may, however, be embodied in many different forms and should not be construed as limiting; rather, these embodiments are provided by way of example so that this disclosure will be thorough and complete, and to fully convey the scope of all aspects of invention to those skilled in the art. Like numbers refer to like elements throughout the description.

Figure 1:
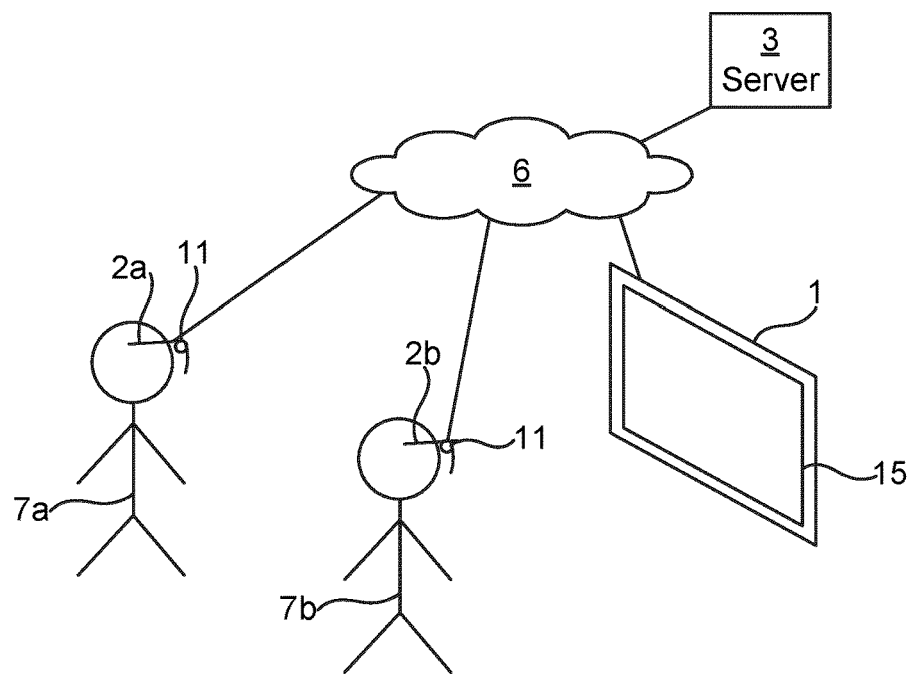
FIG. 1 is a schematic diagram illustrating an environment in which embodiments presented herein can be applied.

FIG. 1 is a schematic diagram illustrating an environment in which embodiments presented herein can be applied. In this scenario, there are two user devices 2*a*, 2*b* and a display device 1. It is to be noted that embodiments presented herein are applicable for any number of user devices and display devices.

The user devices 2*a*, 2*b* and the display device 1 are connected to the same communication network 6. The communication network 6 can contain wide area network components, such as the Internet and/or cellular networks. Additionally or alternatively, the communication network 6 contains short-range communication links, e.g. based on Bluetooth, WiFi (IEEE 802.11x), etc. Alternatively or additionally, the user devices 2*a*, 2*b* can communicate with the display device over a short-range communication protocol, e.g. Bluetooth Low Energy (BLE), Bluetooth, Ultrawideband (UWB), Near-Field Communication (NFC), Radio Frequency Identification (RFID) or any other suitable communication protocol.

A server 3 is also connected to the communication network 6. The server 3 can be located locally or remotely in relation to the user devices 2*a*, 2*b* and the display device 1. The server 3 controls content which includes user-specific information for at least one of the two users 7*a-b*, which is to be provided using the display device 1.

The user devices 2*a*, 2*b* are close to each other, such that there is line-of sight between the user devices 2*a*, 2*b* and the display device 1. The user devices 2*a*, 2*b* are implemented using any suitable user device comprising a camera 11 and a rendering device which is capable of rendering computer generated visual content as an overlay over (real or an image of) real-word objects. In this embodiment, the user devices 2*a*, 2*b* are illustrated as smart glasses. However, the user devices 2*a*, 2*b* can be implemented using any suitable device that is capable of rendering content such that the user can see a combination of real-world objects and the rendered content, e.g. using any mixed reality (virtual reality/augmented reality) device, e.g. smart glasses, smart contact lenses, smartphone/tablet computer that combines images from camera with computer-rendered content, smart windscreen of a car, etc.

A first user 7*a* wears the first user device 2*a* and a second user 7*b* wears the second user device 2*b*.

The display device 1 comprises a display 1 to convey public visual information on its display 15. The display device 1 can be used in any suitable public space, e.g. shopping centres, in street space, in airports.

According to the embodiments presented herein, the display device 1 is used to convey the user-specific information from the server 3 to either one of the users 7*a*, 7*b*. This is achieved by including encoded user-specific information in the visual content shown by the display device 1. The user devices 2*a*, 2*b* extract this data using the camera 11. Each user device 2*a*, 2*b* extracts only data intended for that user device 2*a*, 2*b*. The extracted data is then rendered for the user 7*a*, 7*b* using the respective user device 2*a*, 2*b*. The rendered data is rendered such that it overlays the display device 1.

This allows, from the perspective of each user 7*a*, 7*b*, user-specific information from the server 3 to be presented on the display device. This can be used in a plethora of different scenarios.

In a first scenario, the display device 1 can be used in an airport setting, where the user-specific information is used to indicate to the user what gate to go to, estimated boarding time and to indicate a direction to the gate. If time is short, attention-grabbing graphics (e.g. colours, animations, blinking, etc.) can be applied to emphasize to the user to immediately go to the gate.

The server 3 can be configured for each user 7*a*, 7*b* whether to use functionality of user-specific information via public display devices. In other words, some users may not want to use this functionality and opt out, which is recorded in the server 3. Alternatively, user needs to actively register as a user, i.e. opt in, of this functionality, before it is provided to the user.

The user-specific information can be provided using data elements which are transmitted by the display device by modulating the data elements by means of intensity variations of picture elements in the display. Each data element can be a subset of the user-specific information. In one embodiment, the light intensity is varied by turning pixels or groups of pixels on and off. In one embodiment, the light intensity is varied by only setting pixels or groups of pixels to a specific intensity which can be on, off or somewhere in between. The variations of light intensity can be applied such that it is not visible or is negligible for regular people that look at the display device 1.

Figure 2A:
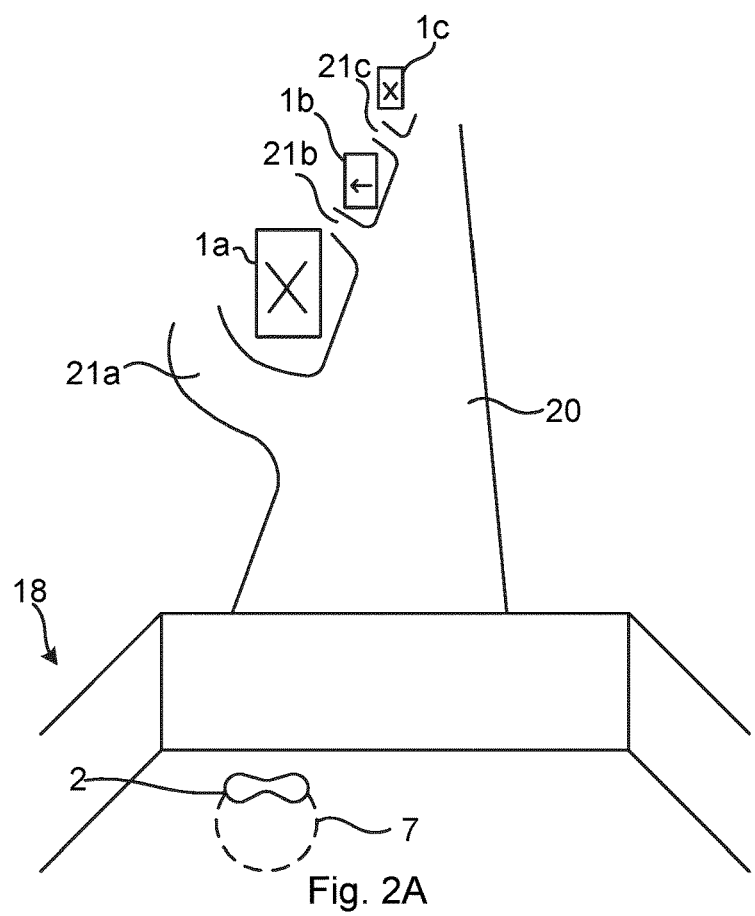
FIGS. 2A-B are perspective views illustrating embodiments applied in a vehicle.
Figure 2B:
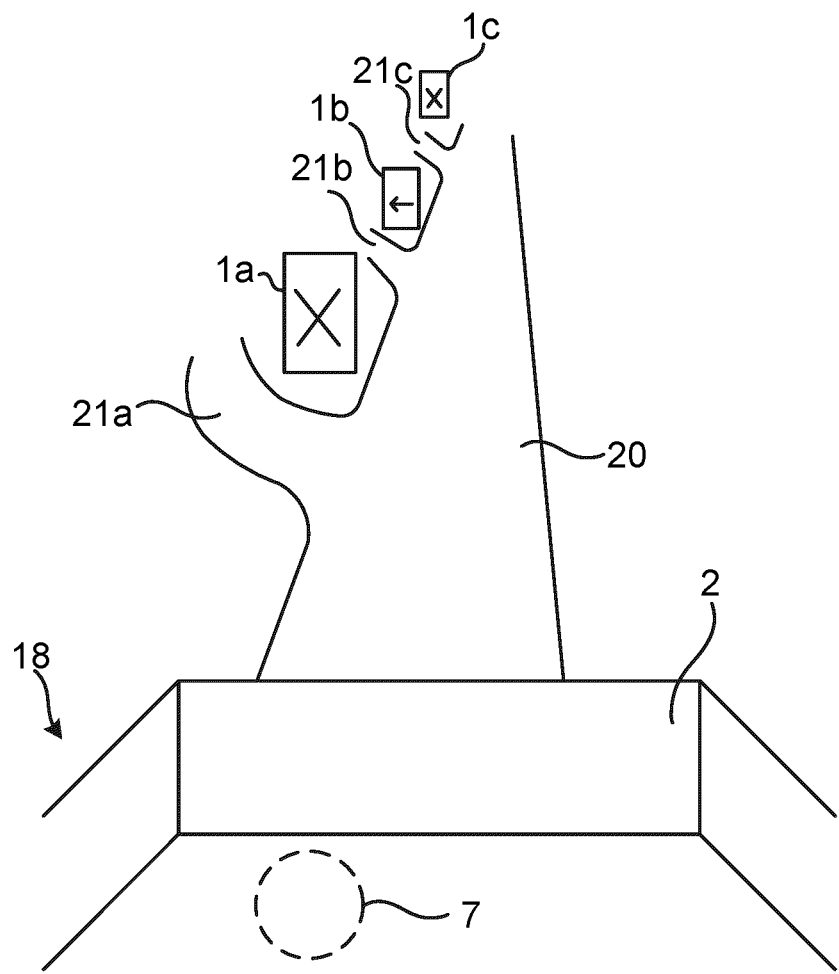

FIGS. 2A-B are perspective views illustrating embodiments applied in a vehicle. A user 7 drives a vehicle 18 along a road 20.

In this example, there is a first display device 1*a*, a second display device 1*b* and a third display device 1*c*, respectively provided by a first side road 21*a*, a second side road 21*b* and a third side road 21*c*. The user 7 needs to turn into one of the side roads 21*a-c* but does not know which one. In this example, the user 7 needs to exit onto the second side road 21*b*. Using a conventional navigation system is not optimal since the side roads 21*a-c* are close to each other and it may be difficult to direct the user 7 to pick the correct side road 21*b*. This type of situation can e.g. occur at an airport when the user 7 needs to return a rental vehicle to a specific car rental company.

In the scenario of FIG. 2A, the user wears smart glasses 2. The displays 1*a*-1*c* are here illustrated in the way that the user experiences them through visual content overlaid using the smart glasses 2.

In this example, visual content is rendered on each one of the three display devices 1*a-c* to guide the user to the correct (second) side road 21*b*. Specifically, the first display device 1*a* is rendered with visual content illustrating that the user should not enter the first side road 21*a*, e.g. with visual content showing a large 'X', e.g. in colour red to further emphasize that the user 7 should not enter the first side road 21*a*, or a forward arrow (not shown). Analogously, the third display device 21*c* is rendered with visual content in the form of a large 'X' to indicate that the user 7 should not enter the third side road 21*c*. In contrast, the second display device 21*b* is rendered with visual content in the form of a left arrow to indicate that the user 7 should enter the second side road 21*b*. The arrow can be in the colour green to further emphasize that the user 7 should enter the second side road 21*b*.

It is to be noted that the 'X's and the arrow are only displayed visible for the specific user 7 using the smart glasses 2.

Looking now to FIG. 2B, the same visual content as in FIG. 2A is rendered for the use. In FIG. 2B, though, the visual content is rendered using a smart windscreen of the vehicle. In this example, the vehicle (or the wind screen with rendering capability) is the user device 2. The smart windscreen allows computer-rendered content to be presented to the user in positions which correspond to the display devices 1*a*-1*c*. Using the smart windscreen, the user does not need to wear or carry any specific device.

Figure 3A:
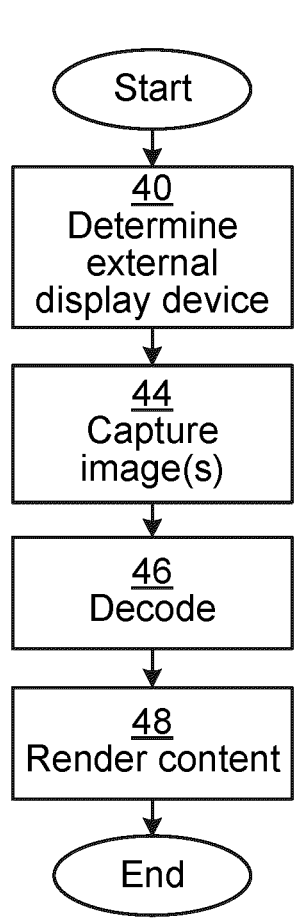
FIGS. 3A-B are flow charts illustrating embodiments of methods of a user device for enabling rendering of user-specific information using a display device.
Figure 3B:
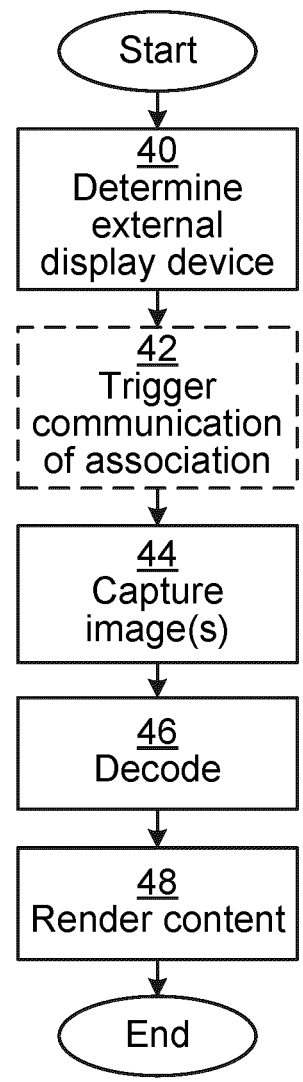

FIGS. 3A-B are flow charts illustrating embodiments of methods of a user device for enabling rendering of user-specific information using a display device. The user device comprises a camera.

In a determine display device step 40, the user device determines a selected display device and creates a logical association between the user device and the selected display device.

In one embodiment, the user device reads a code which is modulated in the visual content shown by the display device. The code can be a form of pilot code that identifies the display device. The pilot can be transmitted at regular intervals indefinitely to allow user devices to determine the identity of the display device. Alternatively or additionally, the user device or another user device (e.g. a wearable device, such as a smartwatch or smart jewellery) connects over a short-range wireless link with the display device. The short-range wireless link can e.g. be based on BLE, Bluetooth, UWB, NFC, RFID or any other suitable communication protocol. The identity of the display device is then obtained using the short-range wireless link. In one embodiment, the user device captures a sound or an infrared signal from the display device to obtain its identity. In one embodiment, the display device shows a QR (Quick Response) code (or has a QR sticker adjacent) for identification of the display device by the user device. In one embodiment, a user is registered as a user of this functionality by registering a code, such as e.g. a QR code on an airplane ticket. The code in combination with positioning of the user device or determination that the user device is in close vicinity of a specific display device could be used for determining a suitable display device.

In all of these embodiments, the user device can only obtain the identity of the display device when the user device is in the proximity of the display device.

In a capture image(s) step 44, the user device captures at least one image of the display device using the camera. For instance, a video containing a series of images can be captured to allow information modulated in the visible data provided by the display to be received by the user device.

In a decode step 46, the user device decodes the at least one image, resulting in decoded content.

The decoding can comprise demodulating data elements in the at least one image. Hence, the data elements are provided visually by the display device. The term visually is here to be interpreted as using visible light. The data elements might thus not be distinguishable for a human with or without a user device even though they are encoded visually.

The decode step 46 may comprise applying a descrambling code to the data elements. The descrambling code allows data to be conveyed in parallel to several user devices. Alternatively or additionally, the descrambling code is used to spread the data elements across the available visual space of the display device.

In one embodiment, the data elements are arranged in a two-dimensional space within the display device in the at least one image. The descrambling code is then in the form of a matrix corresponding to how the data elements are arranged in the two-dimensional space.

The descrambling code can be orthogonal to one or more other descrambling codes, respectively used for other user devices by the same display device. This allows independent conveying of user-specific information to the respective user devices.

The demodulating of the data elements can comprise demodulating the data elements from light intensity variations in the at least one image.

In a render content step 48, the user device renders the decoded content for a user of the user device in a location corresponding to the selected display device. The rendering can be performed using computer-generated visual content.

The visual content can be rendered such that the visual content at least partly covers the selected display device. In other words, the overlaid visual content can block any other content shown on the selected display device, e.g. replacing all public (i.e. not user-specific) visual content actually shown by the selected display device with the rendered visual content.

Looking now to FIG. 3B, only new or modified steps compared to the steps of FIG. 3A will be described.

In an optional trigger communication of association step 42, the user device triggers the logical association between the user device and the selected display device to be communicated to a server. This trigger alerts the server of the association between the user device and the selected display device. In this way, the server knows which display device to communicate with to convey the user-specific information for a certain user. For instance, the logical association can be transmitted to the server by the user device. Alternatively or additionally, the selected display device is triggered (e.g. using a signal from the user device to the selected display device) to transmit the logical association to the server.

In an alternative to the user device selecting a suitable display device, a display device could select a user device to be used to convey the user-specific information.

Figure 4A:
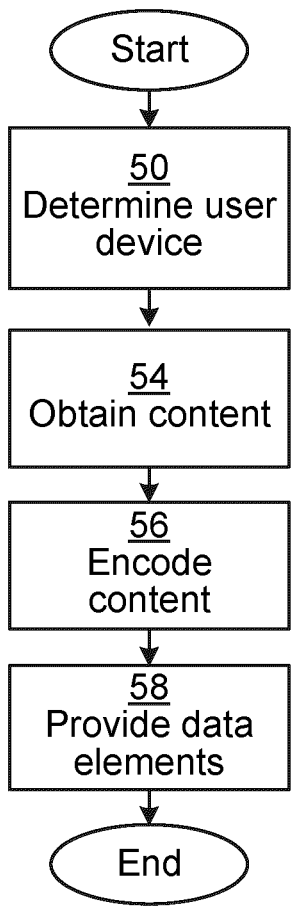
FIGS. 4A-B are flow charts illustrating embodiments of methods of a display device for enabling rendering of user-specific information using a display device.
Figure 4B:
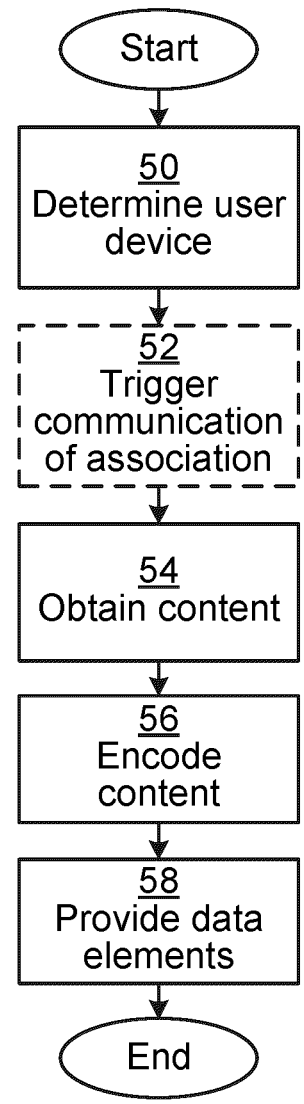

FIGS. 4A-B are flow charts illustrating embodiments of methods of a display device for enabling rendering of user-specific information using a display device. The display device comprises a display. The user device is separate from the display device.

In a determine user device step 50, the display device determines an associated user device and creating a logical association between the associated user device and the display device. The display device is separate from the associated user device.

The display device can identify the associated user device by receiving information of the user device identifying of the display device, as explained above for the determine external display device step 40. For instance, the display device can receive the identity of the associated user device from the server or directly from the associated user device.

Alternatively, the display device identifies the user device directly, e.g. using a camera on the display device. The user device can then be identified e.g. by transmitting light pattern or a QR code that is captured by the display device.

In an obtain content step 54, the display device obtains content to be provided to the associated user device. The content can be a message provided from the server to the associated user device, triggered by the server when the server is made aware of the connection between the display device and the associated user device. The content can contain text, still or dynamic images and/or graphics. The server selects one or more appropriate display devices which are associated with the user device. For instance the display device in the current or projected location of the associated user device can be selected. Optionally, the server triggers other display devices (which may be too far away from the associated user device to show the actual user-specific information) to display arrows pointing to the display device which transmits the user-specific information, in a form of geofencing.

In an encode content step 56, the display device encodes the content, resulting in data elements. The encoding of the content can comprise applying a scrambling code to the content. Each data element can contain a subset of the content. Optionally, each data element is encrypted for the associated user device.

The data elements can then be modulated using intensity variations of picture elements in the display. Data elements can be modulating for a plurality of user devices in parallel, to support the transmission of data to several user devices, and thereby several users, in parallel. The modulation can comprise applying the light variations intermittently in order to keep visible artefacts low for other persons looking at the display.

Scrambling codes for different user devices can be orthogonal to each other. For instance, when arranged sequentially, the data elements can be provided in different slots, e.g. modulo n with an offset that differs for each user device.

In one embodiment, the scrambling codes are similar in principle to those of (W)CDMA (Wideband Code Division Multiple Access. In a (W)CDMA system, all UEs (User Equipment) use the same spectrum but are differentiated by codes.

The data elements can be arranged in a two-dimensional space of the display, in which case the scrambling code is in the form of a matrix corresponding to how the data elements are arranged in the two-dimensional space.

For instance, the data elements could be presented by the display device within an available space of 10×10 pixel groups. The available space is then used to multiplex data elements to several user devices.

A first scrambling code for a first user device can then be:

| 0 | 1 | 1 | 0 | 1 | 0 | 1 | 0 | 0 | 0 |
|---|---|---|---|---|---|---|---|---|---|
| 0 | 0 | 0 | 0 | 0 | 1 | 1 | 1 | 1 | 1 |
| 1 | 0 | 1 | 0 | 0 | 0 | 0 | 0 | 1 | 0 |
| 1 | 0 | 0 | 0 | 0 | 1 | 1 | 0 | 1 | 0 |
| 1 | 0 | 1 | 1 | 1 | 0 | 0 | 0 | 1 | 1 |
| 0 | 0 | 1 | 0 | 0 | 1 | 0 | 1 | 0 | 1 |
| 1 | 1 | 1 | 0 | 1 | 0 | 0 | 1 | 0 | 1 |
| 0 | 1 | 0 | 1 | 1 | 0 | 1 | 1 | 0 | 1 |
| 1 | 1 | 1 | 0 | 1 | 0 | 1 | 0 | 1 | 1 |
| 0 | 0 | 1 | 1 | 1 | 1 | 1 | 1 | 0 | 1 |

At the same time, a second scrambling code for a second user device can be:

| 1 | 0 | 0 | 1 | 0 | 1 | 0 | 1 | 1 | 1 |
|---|---|---|---|---|---|---|---|---|---|
| 1 | 1 | 1 | 1 | 1 | 0 | 0 | 0 | 0 | 0 |
| 0 | 1 | 0 | 1 | 1 | 1 | 1 | 1 | 0 | 1 |
| 0 | 1 | 1 | 1 | 1 | 0 | 0 | 1 | 0 | 0 |
| 0 | 1 | 0 | 0 | 0 | 1 | 1 | 1 | 0 | 0 |
| 1 | 1 | 0 | 1 | 1 | 0 | 1 | 0 | 1 | 0 |
| 0 | 0 | 0 | 1 | 0 | 1 | 1 | 0 | 1 | 0 |
| 1 | 0 | 1 | 0 | 0 | 1 | 0 | 0 | 1 | 0 |
| 0 | 0 | 0 | 1 | 0 | 1 | 0 | 1 | 0 | 0 |
| 1 | 1 | 0 | 0 | 0 | 0 | 0 | 0 | 1 | 0 |

The first user device applies the first scrambling code and the second user device applies the second scrambling code. Hence, in order to send data to the first user device, the display device provides data elements for the first user device only in those pixel groups where the corresponding scrambling code element is '1'. The same procedure is used to supply data to the second user device.

Since the scrambling codes allow data to be transmitted separately, the first and second scrambling codes are orthogonal to each other.

In a provide data elements step 58, the display device provides the data elements using the display.

Optionally, when it is determined that the user stops looking at the display device (determined e.g. by accelerators and/or gyros of the user device), the user device transmits this determination to the display device, indicating that the user has seen the user-specific information. The display device interprets this as an acknowledgement of received data and the display device stops sending the user-specific information.

Looking now to FIG. 4B, only new or modified steps compared to the steps of FIG. 4A will be described.

In an optional trigger communication of association step 52, the display device triggers the logical association between the display device and the associated user device to be communicated to a server. For instance, the logical association can be transmitted to the server by the display device. Alternatively or additionally, the associated user device is triggered (e.g. using a signal from the display device to the user device) to transmit the logical association to the server.

Using embodiments presented herein, user-specific information can be provided using public display devices. Rather than, as is the case with traditional augmented reality, providing information overlaid right in front of the user, the information is here rendered in a position corresponding to the display device, where the user expects to find relevant information. By using the display device to encode the information, a secure and private provision of information to a specific user device (and thus user) is achieved. The information is digital, so encryption can be applied if needed.

FIG. 5 is a schematic diagram illustrating components of the user device 2 of FIG. 1 and FIGS. 2A-B according to one embodiment. The user device is capable of providing computer-rendered visual content overlaid over real-word objects. For instance, the user device 2 can be in the form of an augmented-reality renderer, which overlays visual content over what is seen by the user, e.g. in the form of smart glasses, illustrated in FIG. 1, smart contact lenses, or in the form of a smart windscreen, illustrated in FIGS. 2A-B.

A processor 60 is provided using any combination of one or more of a suitable central processing unit (CPU), multi-processor, microcontroller, digital signal processor (DSP), etc., capable of executing software instructions 67 stored in a memory 64, which can thus be a computer program product. The processor 60 could alternatively be implemented using an application specific integrated circuit (ASIC), field programmable gate array (FPGA), etc. The processor 60 can be configured to execute the method described with reference to FIGS. 3A-B above.

The memory 64 can be any combination of random-access memory (RAM) and/or read-only memory (ROM). The memory 64 also comprises persistent storage, which, for example, can be any single one or combination of magnetic memory, optical memory, solid-state memory or even remotely mounted memory.

A data memory 66 is also provided for reading and/or storing data during execution of software instructions in the processor 60. The data memory 66 can be any combination of RAM and/or ROM.

The user device 2 further comprises an I/O interface 62 for communicating with external and/or internal entities.

A camera 11 is any suitable image capturing device which is capable of capturing visual of real-world objects of its environment and provide the captured image to the processor 60 for further processing. For instance, the camera 11 can be implemented as a conventional two-dimensional digital camera.

A rendering device 12 is a device capable of rendering visual content for the user, which is overlaid real-world objects in some manner. In one embodiment, the visual content is overlaid over captured real-world objects on one screen, e.g. on a smartphone or tablet computer, whereby the screen then shows a combination of image data from the camera of the user device and rendered visual content.

Other components of the user device 2 are omitted in order not to obscure the concepts presented herein.

FIG. 6 is a schematic diagram illustrating components of the display device 1 of FIG. 1 and FIGS. 2A-B according to one embodiment. The display device 1 can e.g. be embodied as a public information display device, e.g. used in airports, as road information and/or for advertising.

A processor 160 is provided using any combination of one or more of a suitable central processing unit (CPU), multi-processor, microcontroller, digital signal processor (DSP), etc., capable of executing software instructions 167 stored in a memory 164, which can thus be a computer program product. The processor 160 could alternatively be implemented using an application specific integrated circuit (ASIC), field programmable gate array (FPGA), etc. The processor 160 can be configured to execute the method described with reference to FIGS. 4A-B above.

The memory 164 can be any combination of random-access memory (RAM) and/or read-only memory (ROM). The memory 164 also comprises persistent storage, which, for example, can be any single one or combination of magnetic memory, optical memory, solid-state memory or even remotely mounted memory.

A data memory 166 is also provided for reading and/or storing data during execution of software instructions in the processor 160. The data memory 166 can be any combination of RAM and/or ROM.

The display device 1 further comprises an I/O interface 162 for communicating with external and/or internal entities.

A display 15 is provided, which can be capable of both displaying general visual content, as well as modulated visual content, as described with reference to FIGS. 4A-B above.

Other components of the display device 1 are omitted in order not to obscure the concepts presented herein.

FIG. 7 is a schematic diagram showing functional modules of the user device 2, 2a-b of FIG. 1 and FIGS. 2A-B according to one embodiment. The modules are implemented using software instructions such as a computer program executing in the user device. Alternatively or additionally, the modules are implemented using hardware, such as any one or more of an ASIC (Application Specific Integrated Circuit), an FPGA (Field Programmable Gate Array), or discrete logical circuits. The modules correspond to the steps in the methods illustrated in FIGS. 3A-B.

A display determiner 70 corresponds to step 40. An association communicator 72 corresponds to step 42. An image capturer 74 corresponds to step 44. A decoder 76 corresponds to step 46. A content renderer 78 corresponds to step 48.

FIG. 8 is a schematic diagram showing functional modules of the display device 1, 1a-c of FIG. 1 and FIGS. 2A-B according to one embodiment. The modules are implemented using software instructions such as a computer program executing in the display device. Alternatively or additionally, the modules are implemented using hardware, such as any one or more of an ASIC (Application Specific Integrated Circuit), an FPGA (Field Programmable Gate Array), or discrete logical circuits. The modules correspond to the steps in the methods illustrated in FIGS. 4A-B.

A user determiner 80 corresponds to step 50. An association communicator 82 corresponds to step 52. A content obtainer corresponds to step 54. A content encoder 86 corresponds to step 56. A data element provider 88 corresponds to step 58.

Figure 9:
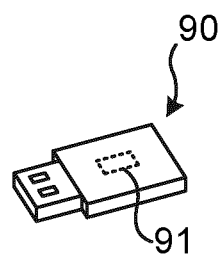
FIG. 9 shows one example of a computer program product comprising computer readable means.

FIG. 9 shows one example of a computer program product 90 comprising computer readable means. On this computer readable means, a computer program 91 can be stored, which computer program can cause a processor to execute a method according to embodiments described herein. In this example, the computer program product is in the form of a removable solid-state memory, e.g. a Universal Serial Bus (USB) drive. As explained above, the computer program product could also be embodied in a memory of a device, such as the computer program product 64 of FIG. 5 or the computer program product 164 of FIG. 6. While the computer program 91 is here schematically shown as a section of the removable solid-state memory, the computer program can be stored in any way which is suitable for the computer program product, such as another type of removable solid-state memory, or an optical disc, such as a CD (compact disc), a DVD (digital versatile disc) or a Blu-Ray disc.

The aspects of the present disclosure have mainly been described above with reference to a few embodiments. However, as is readily appreciated by a person skilled in the art, other embodiments than the ones disclosed above are equally possible within the scope of the invention, as defined by the appended patent claims. Thus, while various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

The invention claimed is:

1. A user device comprising:
    a camera;
    a processor; and
    a memory storing instructions that, when executed by the processor, cause the user device to:
        capture, using the camera, at least one image of real-world objects, including a display device that is separate from the user device;
        decode the at least one image to obtain decoded content that comprises user-specific information which is specific for a user of the user device; and
        render the decoded content for display to the user on a screen as an overlay over the real-world objects that are either rendered on or seen through the screen, with the decoded content overlaid on the display device.

2. The user device according to claim 1, wherein the instructions that cause the user device to render the decoded content comprise instructions that, when executed by the processor, cause the user device to render the decoded content using computer-generated visual content.

3. The user device according to claim 1, wherein the instructions that cause the user device to decode the at least one image comprise instructions that, when executed by the processor, cause the user device to demodulate data elements in the at least one image, the data elements being visually provided by the display device.

4. The user device according to claim 3, wherein the instructions that cause the user device to decode the at least one image comprise instructions that, when executed by the processor, cause the user device to apply a descrambling code to the data elements.

5. The user device according to claim 4, wherein the data elements are arranged in a two-dimensional space within the display device in the at least one image and the descrambling code is in the form of a matrix corresponding to how the data elements are arranged in the two-dimensional space.

6. The user device according to claim 4, wherein the descrambling code is orthogonal to one or more other descrambling codes, respectively used for other user devices by the same display device.

7. The user device according to claim 3, wherein the instructions that cause the user device to decode the at least one image comprise instructions that, when executed by the processor, cause the user device to demodulate the data elements from light intensity variations in the at least one image.

8. The user device according to claim 1, wherein the instructions, when executed by the processor, further cause the user device to create a logical association between the user device and the display device and to trigger the logical association to be communicated to a server.

9. The user device according to claim 8, wherein the instructions that cause the user device to trigger the logical association to be communicated to the server comprise instructions that, when executed by the processor, cause the user device to:
    transmit the logical association to the server; or
    trigger the display device to transmit the logical association to the server.

10. A method for enabling rendering of user-specific information using a display device, the method being performed by a user device comprising a camera, the method comprising:
    capturing, using the camera, at least one image of real-world objects, including a display device that is separate from the user device;
    decoding the at least one image to obtain decoded content that comprises user-specific information which is specific for a user of the user device; and
    rendering the decoded content for display to the user on a screen as an overlay over the real-world objects that are either rendered on or seen through the screen, with the decoded content overlaid on the display device.

11. A display device comprising:
    a display;
    a processor; and
    a memory storing instructions that, when executed by the processor, cause the display device to:
        determine a user device and create a logical association between the user device and the display device, the display device being separate from the associated user device;
        obtain content to be provided to the user device as user-specific information which is specific to a user of the user device;
        encode the content by applying a scrambling code to the content, resulting in data elements, wherein the scrambling code is different from another scrambling code applicable for providing other content to another user device; and
        provide the data elements using the display.

12. The display device according to claim 11, wherein the instructions that cause the display device to encode the content comprise instructions that, when executed by the processor, cause the display device to modulate the data elements using intensity variations of picture elements in the display.

13. The display device according to claim 11, wherein the instructions that cause the display device to encode the content comprise instructions that, when executed by the processor, cause the display device to:
    obtain respective content to be provided to different user devices as respective user-specific information which is specific to respective users of the different user devices;
    apply different scrambling codes to the respective content to be provided to the different user devices, resulting in different sets of data elements for the different respective user devices; and
    provide the different sets of data elements using the display.

14. The display device according to claim 13, wherein the different scrambling codes for different user devices are orthogonal to each other.

15. The display device according to claim 11, wherein the data elements are arranged in a two-dimensional space of the display and the scrambling code is in the form of a matrix corresponding to how the data elements are arranged in the two-dimensional space.

16. The display device according to claim 11, wherein the instructions, when executed by the processor, further cause the display device to trigger the logical association between the display and the user device to be communicated to a server.

17. The display device according to claim 16, wherein the instructions that cause the display device to trigger the logical association to be communicated to a server comprise instructions that, when executed by the processor, cause the display device to:
- transmit the logical association to the server; or
- trigger the user device to transmit the logical association to the server.

18. A method for enabling rendering of user-specific information using a display device, the method being performed by the display device comprising a display, the method comprising:
- determining a user device and creating a logical association between the user device and the display device, the display device being separate from the user device;
- obtaining content to be provided to the user device as user-specific information which is specific to a user of the user device;
- encoding the content by applying a scrambling code to the content, resulting in data elements, wherein the scrambling code applied to the content is different from another scrambling code applicable for providing other content to another user device; and
- providing the data elements using the display.

19. The user device of claim 1, wherein the screen is a screen of smart glasses, smart contact lenses, or a smart windscreen of a car, and wherein the instructions, when executed by the processor, cause the user device to render the decoded content for display to the user on the screen as an overlay over the real-world objects that are seen through the screen.

20. The user device of claim 1, wherein the user device comprises the screen.

* * * * *